United States Patent [19]
Frank et al.

[11] Patent Number: 5,472,318
[45] Date of Patent: Dec. 5, 1995

[54] RUPTURE DISK PRESSURE RELIEF ASSEMBLY FOR A PAINT PUMP

[75] Inventors: Peter L. Frank, Hamel; Thomas F. Kruzel, Maple Grove; Robert D. Cooper, Blaine, all of Minn.

[73] Assignee: Wagner Spray Tech Corporation, Minneapolis, Minn.

[21] Appl. No.: 264,941

[22] Filed: Jun. 30, 1994

[51] Int. Cl.[6] .......................... F04B 49/00; F04B 21/00; F16K 17/14; F16K 17/40
[52] U.S. Cl. .............. 417/306; 417/309; 417/63
[58] Field of Search ..................... 417/306, 309, 417/63; 137/68.1

[56] References Cited

U.S. PATENT DOCUMENTS

| | | | |
|---|---|---|---|
| 1,093,254 | 4/1914 | Clarke | 137/68.1 |
| 1,631,372 | 6/1927 | Harris | 137/68.1 |
| 3,208,388 | 9/1965 | Glasgow | 417/63 |
| 4,195,745 | 4/1980 | Roberts et al. | 137/68.1 |
| 4,273,251 | 6/1981 | McMahon . | |
| 5,316,445 | 5/1994 | Snetting et al. . | |

FOREIGN PATENT DOCUMENTS

| | | | |
|---|---|---|---|
| 2306477 | 2/1973 | Germany | 137/68.1 |
| 906654 | 3/1961 | United Kingdom | 137/68.1 |

OTHER PUBLICATIONS

BS&B Safety Systems, An Introductin to Rupture Disk Technology, Catalog 77-1001 Section A, pp. 1–12.

*Primary Examiner*—Richard A. Bertsch
*Assistant Examiner*—Ted Kim
*Attorney, Agent, or Firm*—Faegre & Benson

[57] ABSTRACT

A pressure relief assembly for use with a paint pump having a chamber with a pressure relief port located immediately adjacent an inlet port of the pump. The pressure relief assembly includes a mounting member, inlet washer, rupture pad and outlet washer. The mounting member is threaded on its exterior surface and includes an inlet end, an outlet end, and a relief passage extending between the inlet and outlet ends. A rupture recess in the inlet end is sized to receive the inlet washer, rupture pad and outlet washer, with the rupture pad positioned between the washers. The inner diameter surface of the outlet washer is convex. The pressure relief assembly is screwed into the pump with the inlet end adjacent to the pressure relief port. The rupture pad forms a seal between the pump chamber and atmosphere that ruptures to vent the chamber when the pressure within the chamber exceeds a predetermined rupture pressure.

6 Claims, 2 Drawing Sheets

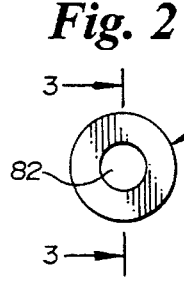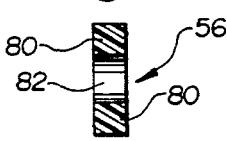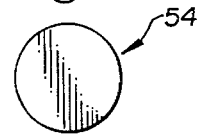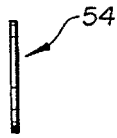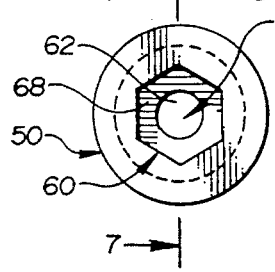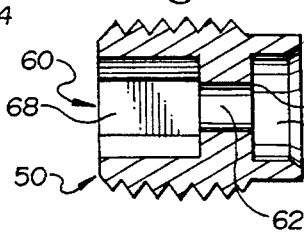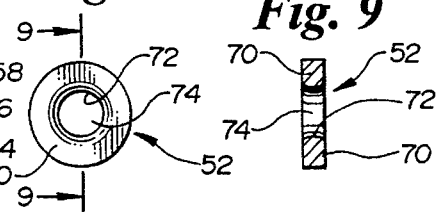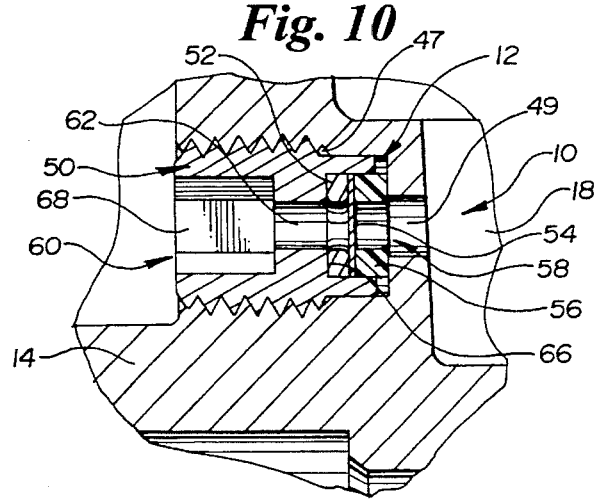

RUPTURE DISK PRESSURE RELIEF ASSEMBLY FOR A PAINT PUMP

BACKGROUND OF THE INVENTION

1. Field of the Invention

The present invention is a rupture disk pressure relief assembly for a spray painting pump.

2. Description of the Related Art

Reciprocating piston-type pumps for spray painting equipment are generally known and disclosed, for example, in the Snetting et al. U.S. Pat. No. 5,316,445. Pumps of this type include a housing with inlet and outlet ports in communication with a paint-pumping chamber. The inlet port is configured to be fluidly connected to a source of paint, while the outlet port is configured to be fluidly connected to a paint spray gun. A piston assembly is mounted for reciprocal motion within the paint-pumping chamber, and is driven by a motor. During operation of the pump, paint is drawn into the paint-pumping chamber through the inlet port. Paint within the paint-pumping chamber is then pressurized by the piston assembly and forced out through the outlet port to the spray gun. It is to be understood that although the present invention is described with respect to piston type pumps, the present invention is believed to be applicable to other types of pumps having a pressurized chamber, for example, diaphragm pumps.

Pumps to which the present invention is directed are conventionally designed to operate at spray pressures within a predetermined operating range of pressures. An operator will select the desired spray pressure through actuation of a pressure selector. A pressure regulating system within the pump maintains the selected spray pressure. Such pumps also typically include spring-biased check valves or leak valve arrangements to vent the pump chamber and ports to atmosphere if the pressure within the pump exceeds a predetermined pressure level.

SUMMARY OF THE INVENTION

One embodiment of the present invention is a piston-type paint pump which includes a paint-pumping chamber, an inlet port and an outlet port. The inlet port is in fluid communication with the paint-pumping chamber and is configured for interconnection to a source of paint. The outlet port is in fluid communication with the paint-pumping chamber and is configured for interconnection to a paint sprayer. A pressure relief port is located in the inlet port and is in fluid communication with the pressurized paint pumping chamber. A piston assembly is mounted for reciprocal motion within the paint-pumping chamber. The piston assembly is driven by a motor to draw paint into the chamber through the inlet port, and to pressurize and force the paint from the chamber through the outlet port. The pressure relief assembly is in fluid communication with the pressure relief port and vents the pressure relief port to atmosphere when the pressure within the port exceeds a predetermined level. The pressure relief assembly includes a rupture pad extending over the pressure relief port and forming a rupturable seal between the pressure relief port and atmosphere. The rupture pad is mounted to seal the pressure relief port by a mounting member which is removably secured to the paint pump.

More particularly, the mounting member of the pressure relief assembly includes an inlet end, and outlet end and a relief passage extending through the mounting member between the inlet and outlet ends. The inlet end is configured for fluid communication with the pressure relief port when the mounting member is secured to the paint pump, and includes a rupture recess forming shoulder. An outlet washer including a convex inner diameter surface is positioned within the rupture recess adjacent to the shoulder. The rupture pad is positioned within the rupture recess adjacent to the outlet washer. An inlet washer is positioned in the rupture recess adjacent to the rupture pad opposite the outlet washer. The mounting member has a threaded exterior surface that mates with a threaded interior surface of the pressure relief port, and is screwed into the pump using an Allen wrench or hex key.

BRIEF DESCRIPTION OF THE DRAWINGS

FIG. 2 is an end view of the inlet washer of the pressure relief assembly shown in FIG. 1.

FIG. 3 is a sectional side view of the inlet washer, taken along line 3—3 in FIG. 2.

FIG. 4 is an end view of the rupture disk of the pressure relief assembly shown in FIG. 1.

FIG. 5 is a side view of the rupture disk shown in FIG. 4.

FIG. 6 is a detailed end view of the pressure relief assembly, including a mounting member, as shown in FIG. 1.

FIG. 7 is a sectional side view of the pressure relief mounting member, taken along line 7—7 in FIG. 6.

FIG. 8 is an end view of the outlet washer of the pressure relief assembly shown in FIG. 1.

FIG. 9 is a sectional side view of the outlet washer, taken along line 9—9 in FIG. 8.

FIG. 10 is an enlarged detail view in section of the pressure relief assembly mounted within the paint pump shown in FIG. 1.

DETAILED DESCRIPTION OF THE PREFERRED EMBODIMENTS

Figure 1:
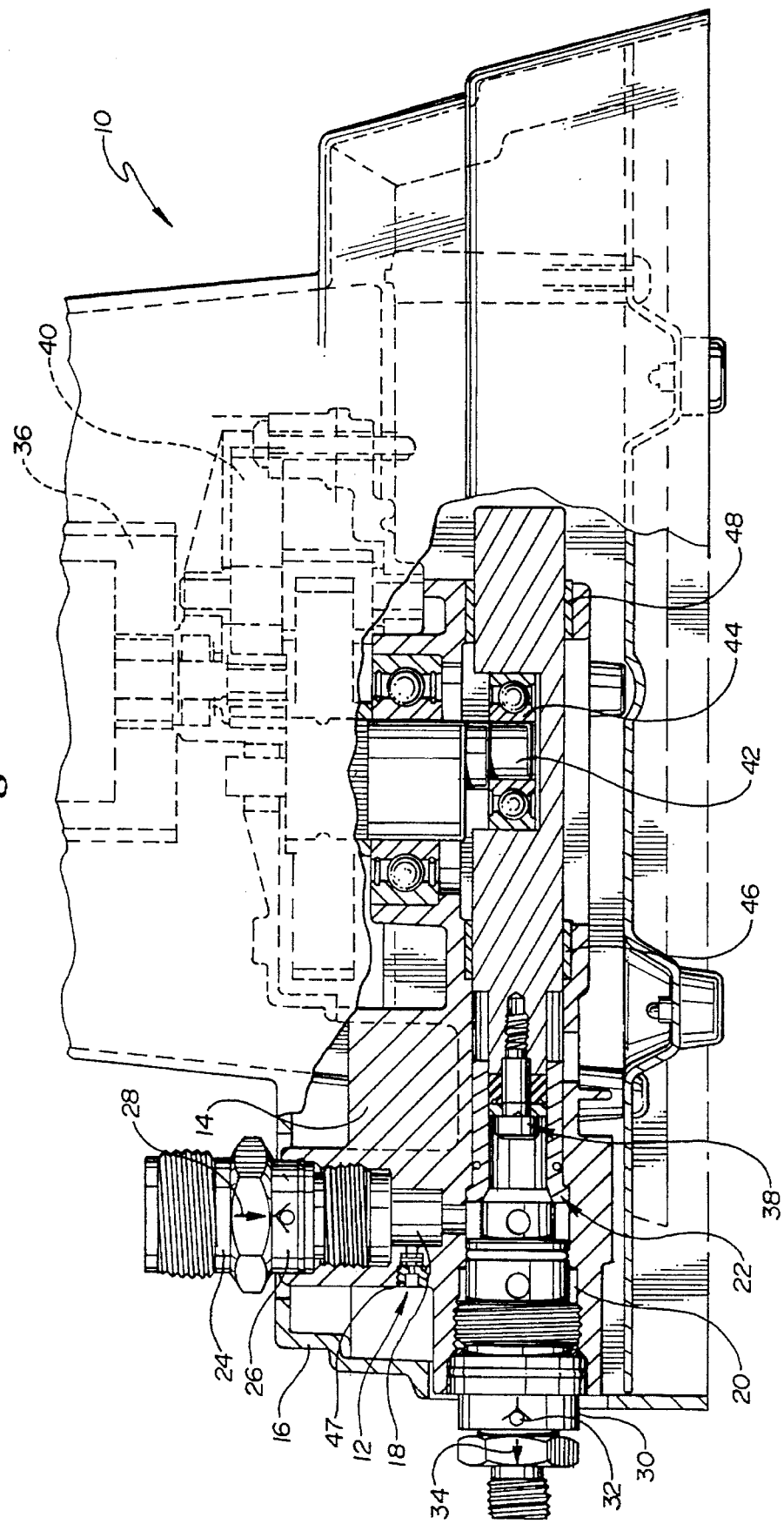
FIG. 1 is a partial sectional view of a paint pump including a rupture disk pressure relief assembly in accordance with the present invention.

A piston-type paint pump 10 including a pressure relief assembly 12 in accordance with the present invention is illustrated generally in FIG. 1. As shown, pump 10 includes a die-cast pump housing 14 enclosed within enclosure 16. Housing 14 includes an inlet port 18 and an outlet port 20, both of which open into (are in fluid communication with) a user-replaceable paint-pumping chamber 22. An inlet fitting 24 for fluidly coupling pump 10 to a supply of paint (not shown) is threaded into inlet port 18. Inlet fitting 24 contains a check valve indicated schematically by symbol 26 to provide uni-directional paint flow into the fitting as indicated by arrow 28. An outlet fitting 30 for fluidly coupling pump 10 to a paint spray gun (not shown) is threaded into outlet port 20. Outlet fitting 30 includes a check valve indicated schematically by symbol 32 to provide uni-directional paint flow out of the fitting as indicated by arrow 34. Pump 10 also includes an electric motor 36 for driving piston assembly 38 within paint-pumping chamber 22. Motor 36 is coupled to piston assembly 38 through a speed-reducing gear train 40 and eccentric 42. Eccentric 42 drives piston assembly 38 in a reciprocal manner via an antifriction bearing 44. Piston assembly 38 is mounted within housing 14 by a pair of bushings 46 and 48. Paint-pumping chamber 22 is described in greater detail in the commonly assigned Snetting et al. U.S. Pat. No. 5,316,445, filed Mar. 3, 1993, and entitled Pumping Apparatus With Piston Seal And Cylinder Removing Means. The Snetting et al. U.S. Pat. No. 5,316,445 is hereby incorporated by reference.

During operation of pump 10, the reciprocal motion of piston assembly 38 draws paint into paint-pumping chamber 22 through inlet fitting 24. Once in the paint-pumping chamber 22, the paint is pressurized and may be delivered to a spray gun (not shown) by pump 10 through outlet fitting 30. Pump 10 is configured to operate over a predetermined operating range of spray pressures. In one embodiment, the maximum pressure of the predetermined operating range is about 2500 psi. The spray pressure is selected by an operator through adjustment of a pressure regulator (not shown), and may be maintained by a conventional or otherwise known pressure regulating system (also not shown).

Rupture assembly 12 is described with reference to FIGS. 1–10. As shown in FIGS. 1 and 10, rupture assembly 12 is secured within a recess 47 in housing 14 and is in fluid communication with a relief port 49 which preferably extends between the recess 47 and input port 18. In other (less preferred) embodiments (not shown), the relief port 49 may extend directly into paint-pumping chamber 22 or outlet port 20. Rupture assembly 12 includes a set screw-type mounting member 50, outlet washer 52, rupture disk 54 and inlet washer 56. As perhaps best shown in FIGS. 6, 7 and 10, mounting member 50 has an upstream or inlet end 58, a downstream or outlet end 60, and a relief passage 62 which extends through the mounting member between the inlet and outlet ends 58, 60. A rupture recess 64 in the inlet end 58 is concentric with the relief passage 62 and has a diameter which is greater than the diameter of the relief passage so as to form a shoulder 66. A tool-receiving recess 68 in the outlet end 60 is configured to receive a tool that can be used to removably secure rupture assembly 12 within recess 47. In the embodiment shown, tool-receiving recess 68 is a hexagonal recess sized to receive an .Allen wrench or hex key. Tool-receiving recess 68 is also generally concentric to and in fluid communication with relief passage 62 in the embodiment shown. The exterior surface of mounting member 50 is threaded and sized to mate with threads on the interior surface of recess 47 in pump housing 14. In the embodiment shown, mounting member 50 is preferably formed of case-hardened low or medium carbon steel.

As perhaps best shown in FIGS. 8, 9 and 10, outlet washer 52 has a pair of opposite faces 70 and an inner diameter surface 72 which forms a central aperture 74. Outlet washer 52 has an outer diameter which enables the washer 52 to be snugly, yet removably, fitted within rupture recess 64 against shoulder 66. For reasons described below, the surface portions of outlet washer 52 forming the transition between the face 70 opposite the washer from shoulder 66 and the inner diameter surface 72 are preferably relatively smooth and free from sharp edges. In the embodiment shown, this smooth transition surface between face 70 and inner diameter surface 72 is a convex inner diameter surface. In the embodiment shown, outlet washer 52 is a steel member with a zinc plate finish coated with clear chromate.

As perhaps best shown in FIGS. 4, 5 and 10, rupture disk 54 is a relatively thin and generally flat member having an outer diameter that enables the disk to be removably, yet snugly, fitted within rupture recess 64 adjacent to and in contact with outlet washer 52. Rupture disk 54 is preferably fabricated from corrosion resistant frangible material. In the embodiment shown, rupture disk 54 is fabricated from a soft aluminum, such as type 1100-0. Rupture disk 54 can also be coated with epoxy or other suitable material for added corrosion resistance.

As perhaps best shown in FIGS. 2, 3 and 10, inlet washer 56 has a pair of opposite faces 80 and a central aperture 82. Inlet washer 56 has an outer diameter that enables the washer to be removably, yet snugly, fitted within rupture recess 64. Inlet washer 56 is positioned adjacent to and in contact with rupture disk 54 on the side of the rupture disk opposite outlet washer 52. In the embodiment shown, inlet washer 56 is a nylon member, and preferably has an outside diameter slightly larger than the diameter of recess 64 to provide an interference fit therebetween to removably retain disk 54 and outlet washer 52 in mounting member 50.

Rupture assembly 12 is preferably assembled by sequentially fitting outlet washer 52, rupture pad 54 and inlet washer 56 into rupture recess 64 of mounting member 50. A downstream surface of rupture disk or pad 54 is positioned adjacent to face 70 of outlet washer 52, while an upstream surface of the rupture pad is positioned adjacent to face 80 of inlet washer 56. The rupture assembly 12 is then screwed into recess 47 of pump housing 14 with inlet end 58 adjacent to relief port 49. As perhaps best shown in FIG. 10, the depth of rupture recess 64 is less than the combined thicknesses of outlet washer 52, rupture disk 54 and inlet washer 56. By snugly screwing mounting member 50 into recess 47, the inlet washer, rupture disk and outlet washer are forced together between shoulder 66 of the mounting member and pump housing 14. It is to be understood that care must be taken to secure assembly 12 to housing 14 to both prevent leakage and to avoid distorting disk 54. With the relief assembly 12 secured within pump 10 in this manner, aperture 74 of outlet washer 52 and aperture 82 of inlet washer 56 are aligned with relief port 49 and relief passage 62. Rupture disk 54 thereby forms a seal between relief port 49 and relief passage 62 (i.e., between inlet port 18 and atmosphere).

Rupture assembly 12 is configured in such a manner that rupture disk 54, and therefore the seal between inlet port 18 and atmosphere, will rupture or burst when the pressure within the inlet port exceeds a predetermined rupture pressure. The rupture pressure is typically a pressure greater than the maximum operating range pressure of pump 10. After rupture pad 54 bursts, input port 18, paint-pumping chamber 22 and outlet port 20 are vented to atmosphere to prevent any further pressure buildup within pump 10. Rupture assembly 12 thereby functions as a safety mechanism in the event the pump pressure regulator malfunctions or for any other reason the pressure within the pump exceeds the rupture pressure. It is to be understood that it has been found preferable to locate rupture assembly 12 immediately adjacent inlet port 18 to provide that pump 10 will immediately lose its prime and (other than an initial single negligible paint discharge after rupture) will thereafter cease pumping paint, thus avoiding messy spillage after rupture, should one occur. Since pump 10 is incapable of pumping paint after rupture pad 52 bursts, the rupture pad must be replaced and the cause of the excess pressure buildup corrected before the pump is returned to its operational status. In the embodiment described above where the maximum operating range pressure is about 2500 psi, rupture assembly 12 is preferably configured to burst at a rupture pressure of about 4650 psi.

The rupture pressure of rupture assembly 12 is determined by a number of factors including the thickness, material and effective area (diameter) of rupture pad 54. The size of apertures 74 and 82 of washers 52 and 56, respectively, will also affect the rupture pressure. The smooth and rounded transition surface between face 70 and inner diameter surface 72 of outlet washer 52 helps prevent fatigue-causing stress points on rupture disk 54. Inlet washer 56 also functions as a skid pad to prevent distortion of rupture disk 54 during installation of assembly 12 into housing 14. It has been determined that the rupture pressure of assembly 12 can be controlled to within about ±150 psi. Using a disk 54 formed of type 1100-0 (per ASTM B-209) aluminum having a diameter of 0.188"+0.000"–0.003" and a thickness of 0.008"±0.0008" together with an inlet washer 56 formed of type 6 nylon and having a bore diameter of 0.086±0.005" and a steel outlet washer 52 having a bore diameter of 0.086"±0.002" and a 0.015" radius and a 32 micro finish results in an assembly having a design rupture pressure of about 4650 psi when assembly 12 is installed to a torque of 15±2 inch-pounds.

Although the present invention has been described with reference to preferred embodiments, those skilled in the art will recognize that changes can be made in form and detail without departing from the spirit and scope of the invention.

What is claimed is:

1. A piston-type paint pump, comprising:

a paint-pumping chamber;

an inlet port in fluid communication with the paint-pumping chamber and configured for interconnection to a source of paint;

an outlet port in fluid communication with the paint-pumping chamber and configured for interconnection to a paint sprayer;

a pressure relief port in fluid communication with at least one of the outlet port, paint-pumping chamber and the inlet port;

a piston assembly mounted for reciprocal motion within the paint-pumping chamber;

a motor driving the piston assembly to draw paint into the paint-pumping chamber through the inlet port, and to pressurize and force the paint from the chamber through the outlet port; and a pressure relief assembly in fluid communication with the pressure relief port for venting the pressure relief port to atmosphere when the pressure within the port reaches a predetermined level the pressure relief assembly including:

a rupture pad extending over the pressure relief port and forming a rupturable seal between the relief port and atmosphere;

an annular rupture pad-engaging face forming an aperture having an inner diameter surface (and where a radiused and smooth transition surface extends) between the face and inner diameter surface; and a mounting member removably secured to the paint pump for mounting the rupture pad between the pressure relief port and the rupture pad-engaging face, to seal the pressure relief port until a predetermined rupture pressure is exceeded and thereafter to vent the pressure relief port to atmosphere.

2. The paint pump of claim 1 wherein:

the mounting member of the pressure relief assembly includes:

an inlet end configured for fluid communication with the pressure relief port when the mounting member is secured to the paint pump;

a rupture recess forming a shoulder in the inlet end;

an outlet end;

a tool-receiving recess in the outlet end; and a relief passage extending through the mounting member between the inlet and outlet ends; and the pressure relief assembly further includes:

an outlet washer positioned within the rupture recess adjacent to the shoulder, the outlet washer having the annular rupture pad-engaging face, inner diameter surface and radiused transition surface.

3. The paint pump of claim 2 wherein the outlet washer includes an inner diameter surface that is convex to a central axis of the washer, the central axis being normal to the rupture pad-engaging face.

4. The paint pump of claim 3 wherein the pressure relief assembly further includes an inlet washer positioned within the rupture recess between the rupture pad and the pressure relief port when the mounting member is secured to the paint pump.

5. The paint pump of claim 4 wherein the depth of the rupture recess is less than the combined thicknesses of the outlet washer, rupture pad and inlet washer.

6. The paint pump of claim 1 wherein the pressure relief port is in fluid communication with the inlet port.

* * * * *

UNITED STATES PATENT AND TRADEMARK OFFICE
CERTIFICATE OF CORRECTION

PATENT NO. : 5,472,318
DATED      : December 5, 1995
INVENTOR(S) : Peter L. Frank et al.

It is certified that error appears in the above-indentified patent and that said Letters Patent is hereby corrected as shown below:

Column 5, line 43, after "level" insert a comma

Column 6, line 4, delete "(and" and insert --and--

Column 6, line 5, delete "extends)" and insert --extends--

Signed and Sealed this

Twelfth Day of March, 1996

Attest:

BRUCE LEHMAN

*Attesting Officer*     *Commissioner of Patents and Trademarks*